(12) United States Patent
Nelson et al.

(10) Patent No.: US 6,775,381 B1
(45) Date of Patent: Aug. 10, 2004

(54) METHOD AND APPARATUS FOR EDITING AND READING EDITED INVISIBLE ENCODEMENTS ON MEDIA

(75) Inventors: David J. Nelson, Rochester, NY (US); Kevin W. Williams, Rochester, NY (US); Jose A. Rosario, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/356,956

(22) Filed: Jul. 19, 1999

(51) Int. Cl.[7] .............................. G06K 7/12; G06K 7/10
(52) U.S. Cl. ........................ 380/54; 235/469; 250/271
(58) Field of Search ............................. 713/176–181; 380/54, 1; 382/130; 250/208.1, 566–569, 271; 358/1.2, 1.9, 1.13, 1.15, 452, 453; 235/469

(56) References Cited

U.S. PATENT DOCUMENTS

| | | |
|---|---|---|
| 3,666,946 A | 5/1972 | Trimble |
| 4,452,843 A | 6/1984 | Kaule et al. |
| 4,869,532 A | 9/1989 | Abe et al. |
| 4,983,817 A | 1/1991 | Dolash et al. |
| 5,059,126 A | 10/1991 | Kimball |
| 5,093,147 A | 3/1992 | Andrus et al. |
| 5,276,472 A | 1/1994 | Bell et al. |
| 5,286,286 A | 2/1994 | Winnik et al. |
| 5,313,235 A | 5/1994 | Inoue et al. |
| 5,314,336 A | 5/1994 | Diamond et al. |
| 5,369,261 A | 11/1994 | Shamir |
| 5,478,997 A | 12/1995 | Bridgelall et al. |
| 5,516,590 A | 5/1996 | Olmstead et al. |
| 5,525,798 A * | 6/1996 | Berson et al. ............... 250/271 |
| 5,541,633 A | 7/1996 | Winnik et al. |
| 5,547,501 A | 8/1996 | Maruyama et al. |
| 5,569,317 A | 10/1996 | Sarada et al. |
| 5,583,331 A | 12/1996 | Dvorkis |
| 5,591,956 A | 1/1997 | Longacre, Jr. et al. |
| 5,684,069 A | 11/1997 | Auslander |
| 5,693,693 A | 12/1997 | Auslander et al. |
| 5,755,860 A | 5/1998 | Zhu |
| 5,766,324 A | 6/1998 | Ikegawa et al. |
| 5,822,436 A | 10/1998 | Rhoads |
| 5,854,478 A | 12/1998 | Liu et al. |
| 5,861,618 A | 1/1999 | Berson |
| 6,191,406 B1 * | 2/2001 | Nelson et al. ........... 250/208.1 |
| 6,490,681 B1 * | 12/2002 | Kobayashi et al. ......... 713/173 |

FOREIGN PATENT DOCUMENTS

| | | |
|---|---|---|
| DE | 41 14 732 A | 11/1992 |
| EP | 0 488 177 A2 | 6/1992 |
| FR | 2 762 545 A | 10/1998 |
| GB | 2 189 800 A | 11/1987 |
| WO | WO 96/32689 A | 10/1996 |

* cited by examiner

Primary Examiner—Kim Vu
Assistant Examiner—Linh L D Son
(74) Attorney, Agent, or Firm—Robert Luke Walker (57) ABSTRACT

A print media has a visible image and a plurality of invisible encodements comprising data printed over it in a hierarchy order, wherein the encodement of the highest order represents a replacement or edited version of the data of lower order encodements. Apparatus and methods provide effectively editing of an existing invisible encodement printed on media with a material sensitive to a first light wavelength by printing an edited or replacement encodement over it with a material sensitive to a second light wavelength of higher order in the hierarchy. Apparatus and methods also provide for selectively reading the highest order encodement, all of the encodements or selected ones of the encodements.

29 Claims, 6 Drawing Sheets

METHOD AND APPARATUS FOR EDITING AND READING EDITED INVISIBLE ENCODEMENTS ON MEDIA

CROSS REFERENCE TO RELATED APPLICATIONS

Reference is made to commonly assigned co-pending U.S. Patent Applications which are all incorporated herein by reference:

Ser. No. 09/122,502, filed 24 Jul. 1998, entitled: DATA READER AND READER SYSTEM HAVING VISIBLE CENTERLESS TARGETING, and filed in the names of David J. Nelson, Robert C. Bryant, Carl F. Leidig; Ser. No. 09/121,907, filed 24 Jul. 1998, entitled: ANGLED TARGETING DATA READER AND READING SYSTEM, and filed in the names of Carl F. Leidig, David J. Nelson, Robert C. Bryant; Ser. No. 09/223,859, filed 31 Dec. 1998, entitled: ARTICLE AND METHOD FOR STORAGE OF DATA, and filed in the names of Kevin W. Williams and Huijuan D. Chen; Ser. No. 08/931,575, filed Sept. 16, 1997, entitled: METHOD AND APPARATUS FOR PRODUCING IMAGE PRINTS WITH VARIABLE DATA ENCODEMENT, and filed in the names of Peter P. Soscia, Jeffrey Alan Small, Thomas C. Reiter; Ser. No. 08/959,036, filed 28 Oct. 1997, entitled: SYSTEM AND PROCESS FOR NON-PERCEPTIBLY INTEGRATING SOUND DATA INTO A PRINTED IMAGE, and filed in the name of Peter P. Soscia; Ser. No. 09/097,975, filed 16 Jun. 1998, entitled: DATA-READING IMAGE CAPTURE APPARATUS, CAMERA, AND METHOD OF USE and filed in the names of Robert C. Bryant, David J. Nelson, Jeffrey A. Small; and Ser. No. 09/128,881, filed 04 Aug. 1998, entitled: METHOD OF PULSING LIGHT EMITTING DIODES FOR READING FLUORESCENT INDICIA, DATA READER, AND SYSTEM, and filed in the names of Thomas M. Stephany, Bryan D. Bernardi, Robert C. Bryant, David J. Nelson.

FIELD OF THE INVENTION

The invention relates to media bearing invisible encodements that may be edited and read employing a reader, and particularly to methods and apparatus employing a hierarchy of invisible dyes for recording multiple encodements over one another on the media to enable selective editing, each invisible dye rendered visible to a reader under differing applied wavelengths of light, whereby the invisible encodements may be selectively captured, decoded and reproduced as data, sound or visual information and methods of producing the same.

BACKGROUND OF THE INVENTION

It is well known to imprint data on various articles and objects, including printed media, labels, containers, vehicles, etc., in the form of a machine readable, code or "symbology" that is visible to the eye but requires a reader to read and decode. The terms "symbology" or "symbologies" are generally employed to denote spatial patterns of symbology elements or marks, wherein each mark has a shape and separated from an adjacent mark by a spacing between the marks, whereby information is encoded in the shapes and/or the spacings between the marks, and embrace bar codes and other codes as described further below. Typically the decoded information output by the reader is used by a machine in a process of identification of the article and to associate it with other data, e.g. unit price and restocking code, which may be displayed and printed out. A great many symbologies and specialized symbology readers have been adopted over the years.

It is also known to encode aural information as such machine readable bar codes associated with images on media so that the aural information or sound can be reproduced from the encoded symbology. Such systems are shown, for example, in U.S. Pat. Nos. 5,276,472 and 5,313,235 in relation to photographic prints, and in U.S. Pat. Nos. 5,059,126 and 5,314,336 in relation to other objects or printed images.

Furthermore, it is well known to record or print symbologies or human recognizable images on various media, e.g., documents, identity cards, financial instruments, professional photographic prints, etc., to verify identity or inhibit unauthorized use or copying, and on stamps and envelopes in postal cancellation applications. Such printing is typically done with one or more invisible ink or dye imprinted on the surface of the document or incorporated into internal layers of the media. These symbologies or recognizable images are normally invisible but can be made visible to and read by a scanner or reader when illuminated by a specific light wavelength or band, e.g. infrared and ultraviolet wavelengths. The printed invisible symbologies or images can be made with a single invisible material sensitive to a single light wavelength or two printed invisible encodements or images can be with two invisible materials, wherein each material is sensitive to a separate light wavelength as described, for example, in U.S. Pat. No. 5,525,798. Such symbologies or images are intended to be permanently recorded or printed onto or incorporated within the media and to be tamper resistant.

The above-referenced, commonly assigned and pending patent applications disclose recording "variable data" as an invisible "encodement" of a selected symbology located in an image field on media on a photographic print image or a print that is produced by other means. The term "variable data" includes data that varies from print to print and contains information related to the visible print image. The "encodement" is preferably formed of a two-dimensional symbology that is relatively dense and is at least co-extensive in area with the visible photographic image to maximize the amount of sound information that can be recorded. The encodement is invisible or substantially invisible to the human eye when viewed under normal viewing conditions, that is, facing the viewer and under sunlight or normal room illumination such as incandescent lighting. This ensures that the encodement does not materially degrade the visible print image.

A number of encodement materials and encodement printing techniques are disclosed in the above-referenced commonly assigned and pending patent applications. It is contemplated that the preferred encodement materials would be infrared absorbing dyes imprinted onto the visible print image using thermal printing or inkjet printing techniques. The user that receives such a print with the invisible encodement made by a photofinisher or that prints an encodement onto visible print image would employ a playback unit, e.g., a hand held reader, to capture the encodement and reproduce or play back the sound or display the visual information or otherwise use the variable data of the encodement.

It is also contemplated that the information that is to be encoded into the invisible encodement includes camera recorded information and user recorded information that is recorded on a filmstrip at the time that a filmstrip image frame is exposed in the manner described in the above-referenced '472 patent for example. This use of invisible encodements overlying the print image advantageously increases the area in which the encodement can be recorded beyond the border or back side of the print shown in the '472 patent. It is further contemplated that the invisible encodements will be printed over or with the visual image at the time that prints are made from the filmstrip image frames. Typically, such prints would be made for consumers (hereafter referred to as users) from such filmstrips having the capability to record sound and camera information by photofinishers.

In addition, digital cameras are available that capture digital image data when used and also have the capability of recording user input sound information and camera input exposure information at the time the image is captured by the user. Software implemented typically in a personal computer is employed to process the digital image data and display the images on a monitor for editing and to make permanent prints of such digitally captured images employing inkjet or laser color printers. There is a need for a method and apparatus for printing such an invisible encodement on a visible print image that is made using the printer coupled to the personal computer.

This need also exists in other contexts where the user desires to generate information independent of the digital camera input information or information that is already on a print provided by a photofinisher and to print it as an invisible encodement on the visible print image. For example, the user of such a system may obtain a digital image file from another source than a digital camera, e.g., from an Internet source or by scanning an image. In this context, there is also a need for a method and apparatus for printing such an invisible encodement on a visible print image that is made using the printer coupled to the personal computer.

These needs cannot be met by simply writing over the existing invisible encodement using the same wavelength absorbing or fluorescing ink or dye (e.g., an infrared absorbing dye) without introducing further errors in reading and reproducing the encoded sound or visual information. Interference of the newly recorded encodement over the existing encodement would occur unless the existing invisible encodement is removed or rendered so faint that it does not exceed a noise threshold of the imager. It would not be practical for the user to remove or render the existing encodement that faint, because of potential damage to the visible print image and the inability to accurately gauge that the removal or rendering has been effective, since it is invisible to the eye.

It is also impractical to write over the existing invisible encodement using a higher concentration or greater laydown of absorbing or fluorescing ink or dye than the earlier recording and relying on the difference in absorbency or fluorescence to only read the later, more concentrated material. It would be necessary to define a threshold for the reader that would effectively mask or ignore the lower absorbance or fluorescence levels that are sensed, which would be difficult to define accurately enough to avoid mistakenly masking or ignoring a correct but low concentration encodement. The encodement would not be found or would be read incorrectly if only parts of it exceeded the threshold. Also, such dyes and inks tend to be come visible to the eye as the concentration that is printed on media is increased. Given the difficulties with visible absorbency of infrared and fluorescent dyes, and the relatively low maximum contrast achievable, this is not a practical solution.

SUMMARY OF THE INVENTION

The invention is defined by the claims. The invention, in its broader aspects, provides: (1) a print media having a visible image and a plurality of invisible encodements comprising data printed over it in a hierarchy order, wherein the encodement of the highest order represents a replacement or edited version of the data of lower order encodements; (2) apparatus and methods for effectively editing an existing invisible encodement printed on media with a material sensitive to a first light wavelength by printing an edited or replacement encodement over it with a material sensitive to a second light wavelength of higher order in the hierarchy; and apparatus and methods for selectively reading the highest order encodement, all of the encodements or selected ones of the encodements.

The editing capability is preferably provided using multiple wavelength materials, e.g., dyes or inks, in printer containers available for use with conventional consumer use printers and a reader capable of selectively capturing and decoding encodements printed with materials sensitive to multiple distinct wavelengths of light. A hierarchy of distinct wavelength sensitive, invisible print materials is established for printing the initial and multiple subsequently printed encodements. When illuminated by a predetermined illumination wavelength of the hierarchy, the symbology of each encodement fluoresces at a further predetermined wavelength or absorbs the illumination wavelength.

The reader is supplied with multiple encodement illumination light sources or filters for a single broad band light source to illuminate the encodements on the media with the hierarchy of illumination wavelengths. The reader is also supplied with an array of light sensitive elements that are selectively rendered sensitive to the illumination wavelengths of the hierarchy, in the case where light absorbing materials are used to print the encodements, or sensitive to the fluorescent wavelengths of the hierarchy, in the case where fluorescing materials are used to print the encodements.

The reader can be sequentially operated to render the light sensitive elements sensitive to the hierarchy of illumination or fluorescing wavelengths either automatically in a predetermined sequence or selectively upon the initiative of the user. The reader captures and decodes the selected one or all encodements and plays back the decoded sound or displays the decoded visual information or otherwise employs the variable data. Alternatively, the reader automatically determines the most recently recorded encodement as a function of the established hierarchy and decodes and plays back or displays that information only. The reader can also advise the user of the number and wavelengths of the encodements that are detected in this process.

Theoretically, invisible print materials sensitive to a large number of wavelengths can be employed in the hierarchy. However, for simplicity, the user can be provided with just one further wavelength sensitive print material in a suitable printer container for home use in editing encodements printed by a photofinisher on photographic prints.

It is an advantageous effect of the invention that the user that initially records an invisible encodement on a print or receives a print with an encodement printed by a photofinisher or from another source is provided with the capability of editing the invisible encodement while preserving the print that it is recorded on. The invention provides that such invisible encodements that are not pleasing or are printed in error or that have degraded due to exposure or handling to the point where reproduction quality is impaired can in effect be written over. This is of great advantage for the instances in which an archival print which may not be able to be reproduced to the same image quality has been encoded erroneously. Where the data captured in a digital or conventional photographic camera is automatically recorded on the prints made by a photofinisher as an invisible encodement, there would often be a desire to customize or edit the data at a later time. Similarly, the user may desire to customize or edit the data and print a further invisible encodement over previously printed invisible encodements on a visible print image that the user has previously printed or obtained from another source than a photofinisher. The invention provides a high degree of flexibility and choice in printing invisible encodements on a visible print or on other media.

BRIEF DESCRIPTION OF THE DRAWINGS

The above-mentioned and other features and advantages of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
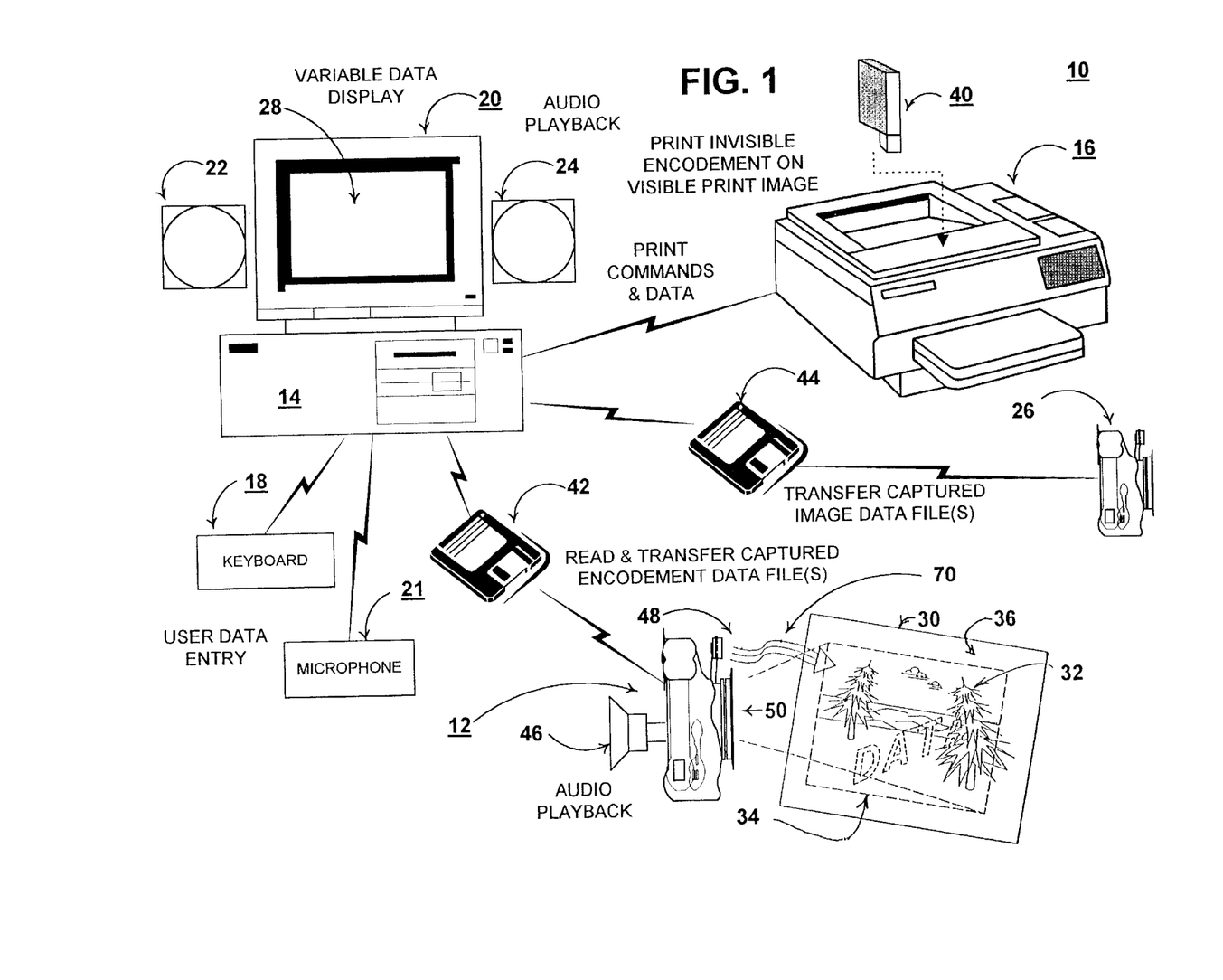
FIG. 1 is a schematic illustration of the system employed by a user to read or to print one or a plurality of invisible encodements on prints that are either received from a photofinisher or are otherwise acquired by or made by the user operating the system.

In FIG. 1, a comprehensive user system 10 comprises a hand held reader 12, a personal computer 14 that is coupled to a printer 16, a keyboard 18, a monitor 20, a microphone 21, and computer controlled audio speakers 22 and 24 in the conventional manner, and a printer recording medium or container 40 containing at least one invisible print material for printing invisible encodements. The user system 10 optionally can also include a digital camera 26 for capturing visible images as digital image data files 44 that are displayed on the monitor screen 28 and printed as prints by printer 16 along with a first recorded invisible encodement. The personal computer 14, printer 16, keyboard 18, monitor 20, microphone 21, and computer controlled audio speakers 22 and 24 and their interconnections can take the form of any personal computer system operating with known operating systems and software. Certain aspects of the present invention involving use of these components to display or play back the data files generated by the hand held reader 12 capturing and reading invisible encodements on print media 30 or to compose and print an invisible encodement using printer 16 and invisible printing material contained in container 40 are described in detail below.

It will be understood that printer 16 can take any form capable of printing the invisible encodements on media, e.g., photographic prints, print quality paper, or plain paper or the like and on objects, and presently includes laser printers, inkjet printers, thermal dye transfer printers, etc., and container 40 represents a source, e.g. a laser toner or inkjet cartridge or thermal dye transfer donor media.

The digital camera 26 is preferably a conventional one of the KODAK digital science® cameras capable of user input sound and camera exposure data recording that can be interfaced with the personal computer 14 for audio and video reproduction and for making visible prints of images captured by the digital camera 26. For example, the digital camera 26 can be the Model 420/460 Color Infrared (CIR) cameras having sound recording capability and removable PCMCIA-ATA storage media that can be coupled to the personal computer 14 by a PCMCIA slot adapter. The digital camera 26 can also be combined with the hand held reader further depicted in FIGS. 4 and 5 according to the teachings of the above-referenced, commonly assigned, U.S. patent application Ser. No. 09/097,975, incorporated herein by reference. Therefore, it will be understood that the following descriptions of the uses and operations of the digital camera 26 and the hand held reader 12 can apply to separate or combined components.

Figure 2:
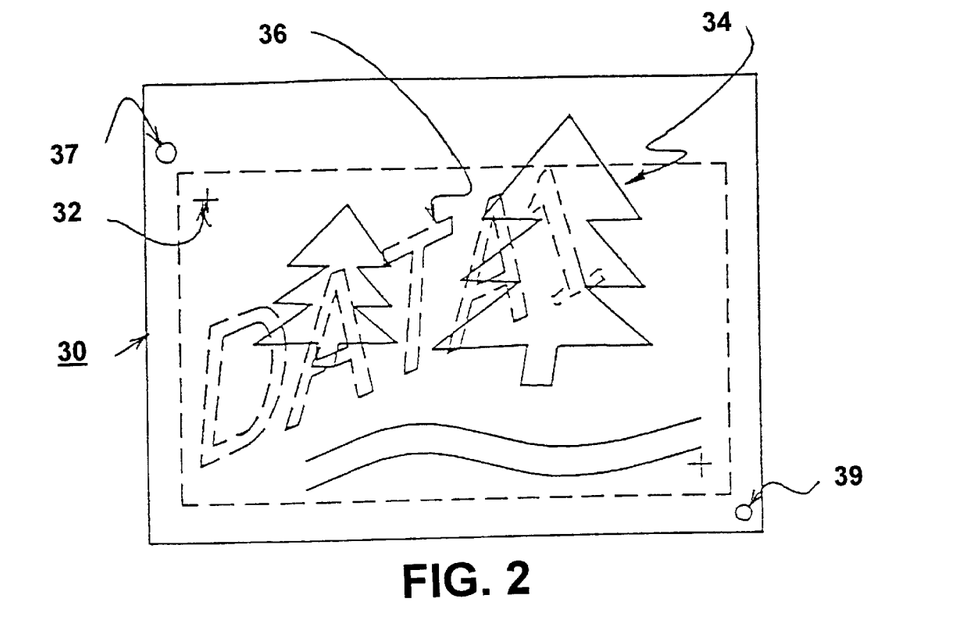
FIG. 2 is a view of a print media bearing a visible image and a single invisible encodement printed or recorded using a material sensitive to a first light wavelength.
Figure 3:
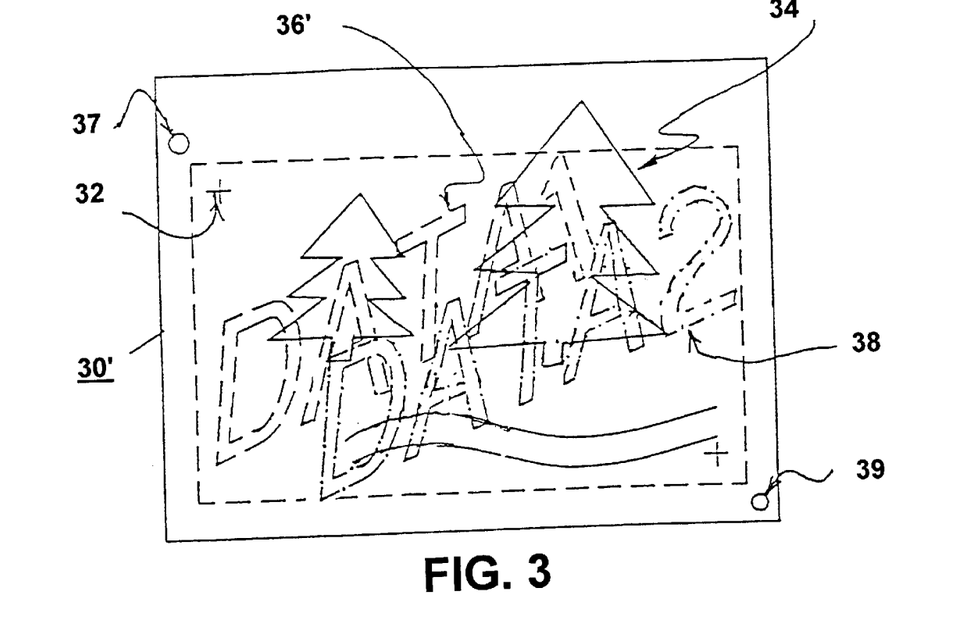
FIG. 3 is a view of a print media bearing a visible image and lower order and highest order invisible encodements printed or recorded each using a material sensitive to differing light wavelengths.

Attention is directed to FIGS. 2 and 3 before further describing how the components of the user system 10 can be selectively used to either print an invisible encodement or to read a plurality of such invisible encodements of the predetermined hierarchy. FIG. 2 is a view of a print media 30 having a printed surface 32 bearing a visible image 34 and an initially printed, or lowest order, invisible encodement 36 of a predetermined hierarchy of encodements. Invisible encodement 36 is denoted "DATA 1" and is printed or recorded using a material sensitive to a first or lowest order light wavelength of the defined hierarchy. FIG. 3 is a view of a print media 30' bearing the visible image 32 and an invisible, second, higher order encodement 38, denoted "DATA 2" of a material sensitive to a second light wavelength printed over an invisible, previously recorded, lowest order, invisible encodement 36' printed or recorded using a material sensitive to a predetermined light wavelength of the hierarchy. The print media 30' can be considered to be the print media 30 of FIG. 2 which has been reprinted with the subsequent, highest order, invisible encodement 38 overlying the previously recorded, lowest order, invisible encodement 36. It will be understood that while only the earlier and later recorded, invisible encodements 36' and 38 are depicted in FIG. 3, that a large number of such invisible encodements can be printed on the printed surface 32 of the print media 30. There may be "N" encodements in the hierarchy defined by the materials sensitive to differing frequencies that are generally invisible to the human eye when the visible image 32 is viewed under normal natural and artificial illumination. However, it is contemplated that the highest order encodement 38 may be formed of a material that is at least faintly visible to the eye under such light conditions. In this way, the visible image is printed in an image field of a surface of the print media, and each encodement is printed in a symbology within the image field and over a substantial portion of the visible image in the image field. The "substantial portion" preferably can most of or all of the visible image area or a greater area of the print media that it appears on.

The printed surface 32 also can optionally bear visible fiducial points 37 and 39 that can be employed to bracket the invisible encodements to be captured and read by the hand held reader 12. The above-referenced U.S. patent application Ser. Nos. 09/122,502, and 09/121,907, which are both hereby incorporated herein by reference, set forth systems and methods for assisting the user of a hand held reader 12 in achieving the optimal alignment with a relatively planar image field.

Print media 30' of FIG. 3 may be considered to be an original print bearing only one invisible encodement 36' corresponding to the invisible encodement 36 of FIG. 2, that is to be edited by composing the data file and printing the highest order invisible encodement 38 over it as shown in FIG. 3 in accordance with the present invention. The visible image 34 on which the invisible encodement 36' is printed in accordance with the above-incorporated patent applications is typically originally captured on photographic film using a conventional photographic camera. Sound information is generated and encoded for printing as the invisible encodement in the image field of a photographic print made from the film image. In this case, the invisible encodement 36' on the printed surface 32 can be produced by the photofinisher through development of a photographic emulsion layer of the photographic print paper. Alternatively, the invisible encodement 36' can be made by the user or photofinisher by printing it upon a photographic print made from a captured photographic image by inkjet printing, thermal dye transfer printing, or other printing method.

Furthermore, in the system of FIG. 1, a visible image can be captured by the digital camera 26 having the capability of capturing a scene image as image data and also recording sound information as sound data to be associated with a print made from the image data. In this case, the invisible encodement 36' is produced using system 10 by encoding the sound data into symbology and printing it upon a photographic print made on the printer 16 by inkjet printing, thermal dye transfer printing, or other printing method.

The present invention contemplates use of sophisticated, two-dimensional symbologies of the encodements 36, 36', 38, et seq., using symbology elements that have been developed or will be developed for maximizing the amount of sound information or other data that can be encoded on printed surface 32. Bar code symbols are formed from bars or elements that are typically rectangular in shape with a variety of possible widths. The specific arrangement of symbols defines the character represented according to a set of rules and definitions specified by the code or symbology used. The relative widths of the bars and the spaces between the adjacent bars is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist including UPC/EAN, Code 39, Code 49, Code 128, Codabar, Interleaved 2 of 5, and PDF 417 used by Symbol Technologies, Inc., of Holtsville, N.Y. Or the two-dimensional, high density, symbology marketed as "PaperDisk" by Cobblestone Software, Inc., of Lexington, Mass. may be employed.

The "PaperDisk" software may be installed in the memory of personal computer 14 to enable the user to compose a data file and to operate the printer 16 to print the symbology as an encodement on any media that the printer is capable of printing on. The printer 16 can print the encodement using printer drivers of the software, and can print it as an invisible encodement using the invisible print material in container 40. Similarly, the software can be employed to decode a data file 42 generated by hand held imager 12 as described below and to display, audibly play it back or print it out in a visible, decoded print form.

To recapitulate, the nature, content, and manner of production of the print media 30 and the visible image 34 and the initial or lowest order invisible encodement 36 produced by a source other than the user of the system of FIG. 1 is not critical to the present invention. The visible image 34 is printed information that can be seen by the user under ordinary visible wavelength light conditions, in the form of pictorial information, text or other alphanumeric information, or nonalphanumeric indicia. Each invisible encodement is preferably recorded or printed as an invisible layer of symbology elements of the types described above. The symbology elements of each encodement of the hierarchy are each recorded or printed using materials that are "sensitive" to illumination with a certain wavelength of light in a band outside the visible spectrum. By "sensitive" is meant that the materials either absorb the incident wavelength or fluoresce at another wavelength or are otherwise luminous when triggered to do so by the incident light wavelength. Depending upon the sensitivities of the materials, selected wavelengths of infrared radiation or ultraviolet radiation, or both, can be used as the incident light wavelengths of the hierarchy.

The planar imager of the hand held reader 12 is similarly rendered sensitive to the reflected (or transmitted if the media base is transparent) or fluorescent or luminescent light wavelength. In this way the negative or positive image of the symbology elements of each encodement of the hierarchy can be rendered visible to and captured and read by the hand held reader 12. Suitable invisible dyes for imprinting symbology elements as the encodements 36, 36', 38 print medias 30, 30' are described in above-referenced U.S. patent application Ser. No. 09/223,859 and U.S. patent application Ser. No 08/931,575. Such invisible dyes can be read by illuminating the image field with invisible electromagnetic radiation that causes the dye to fluoresce. The fluorescent emission of the symbology recorded as the encodement within the image field is imaged as a planar symbology image upon a planar imager that is sensitive to the emission as described in the above-referenced U.S. patent application Ser. No. 09/238,881 which is hereby incorporated herein by reference.

Preferably, however, the invisible dyes used to imprint the invisible symbology elements of the encodements in the hierarchy are infrared absorbing dyes contained in one or more container 40. Certain of the dyes fluoresce when exposed to one infrared wavelength and absorb when exposed to another infrared wavelength. In the practice of the present invention, the selected dyes must be capable of being formulated into inks that can be used in thermal printing or in inkjet printing so that they can be used in cartridges of such typically available consumer printers. A hierarchy of such dyes are used in the present invention to provide for the discrimination between successively printed encodements on a given print media. For example, an 880 nm sensitive dye can be used as the first order dye for printing the first order invisible encodement, and a 1000 nm sensitive dye can be used as the second or highest order invisible encodement. The reader can be programmed to search for the longer wavelength invisible dyes on the particular print or object that is being read as described further below. Many dyes are found in the prior art that can be selected to form the hierarchy. See U.S. Pat. Nos. 5,093,147; 5,286,286; 5,516,590; 5,541,633; 5,684,069; 5,755,860; and 5,766,324 for examples of differing dyes or inks that may be selected for thermal printing or inkjet printing and which either absorb a selected impinging light wavelength or fluoresce in response to the impinging light.

The hand held reader 12 provides the capability of capturing each invisible encodement image 34, decoding the symbology of the encodement into a data file, decompressing it, converting it to analog audio signals and playing it back as sound through the built in amplifier and speaker 46. In addition, it is capable of transmitting the encodement image data file 42 to the personal computer 14 by way of a direct port connection or the diskette or PCMCIA card. The hand held reader 12 includes a light array 48 for illuminating the printed surface 32 with an incident or impinging light beam 70 having selected invisible light wavelengths of the hierarchy to cause the invisible encodement 34 to absorb or fluoresce depending on the type of material used to print the invisible encodement. In the former case, the higher intensity reflected light between symbology elements is focused through the image capture lens 50 on an internal planar imager 54 (shown in FIG. 4) that is sensitive to the reflected invisible light wavelength to provide a negative image of the symbology elements. In the latter case, the symbology elements fluoresce in response to the invisible light, and the fluorescence of the symbology elements is focused through the image capture lens 50 on the internal planar imager 54 sensitive to the invisible fluorescent light wavelength to provide a positive image of the symbology elements.

The above-referenced U.S. patent application Ser. No. 08/931,575, incorporated herein by reference, discloses systems for reading of encodements of this type. The invisible encodement image is illuminated, and the illuminated image is captured by a planar imager 54, e.g. a CCD or CMOS array imager, and decoded and played back as sound through various sound reproduction systems. During reading, it is necessary to locate the planar imager parallel with the image field and generally in alignment with a central point of the image field or visible print in order to image the encodement and capture and decode the symbology accurately. Otherwise, part of the encodement will not be imaged by the planar imager and/or the symbology will be distorted if the image field plane is skewed to the plane of the planar imager.

Although it is referred to herein as "hand held", it will be understood that hand holding of the hand held reader 12 is a convenience but is not necessary to the practice of the present invention. The hand held reader 12 can be permanently or temporarily mounted to a support in actual use. Or, in a computer-based system, all of the components of the hand held reader 12 could be incorporated into a flat bed or paper feed type desktop scanner or even in such scanning capabilities incorporated into the printer 16.

Figure 4:
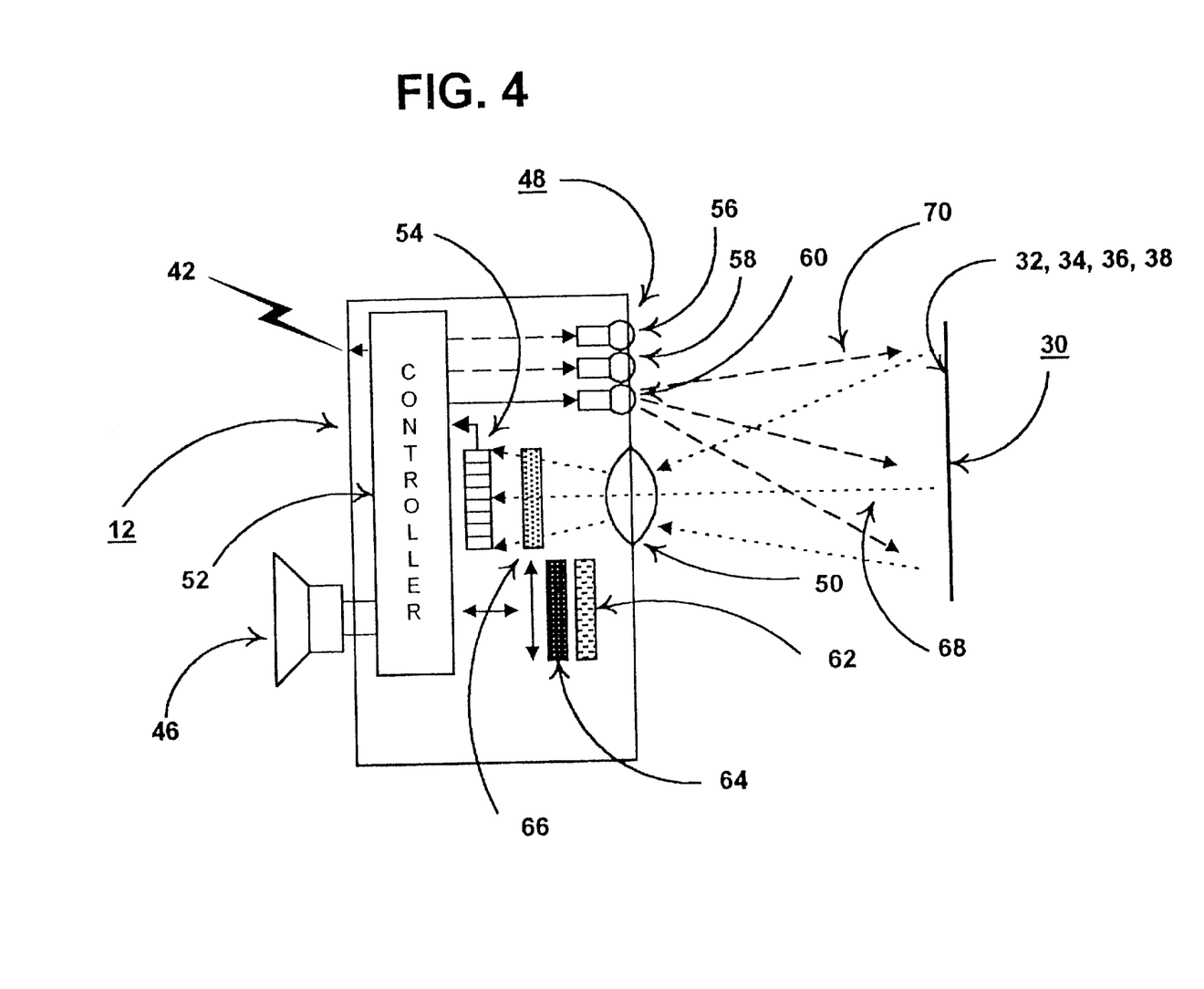
FIG. 4 is a schematic illustration of components of the hand held reader of the present invention.
Figure 5:
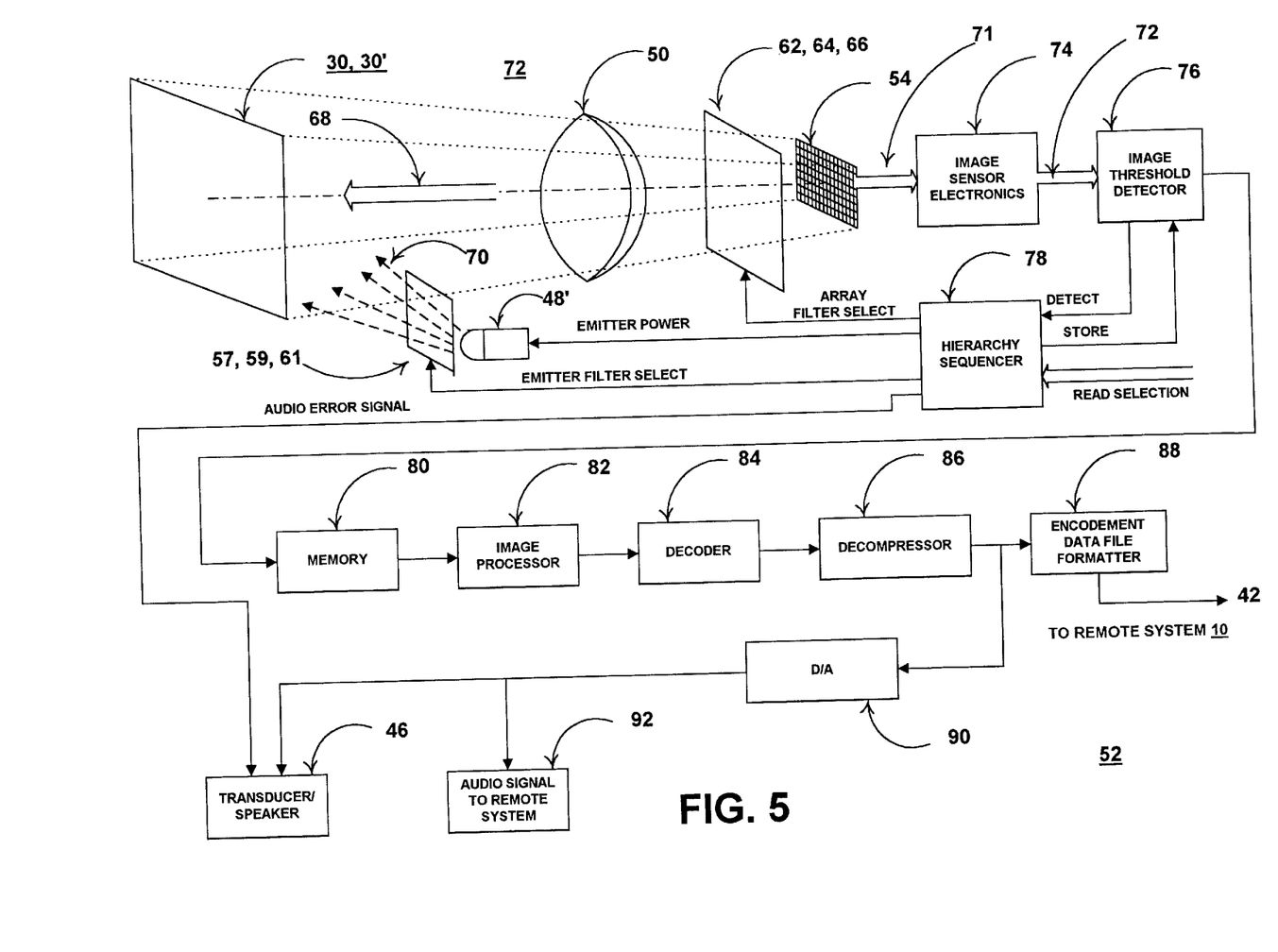
FIG. 5 illustrates structure and functional blocks of the reader of FIG. 4 for capturing and decoding the highest order encodement, all encodements or selected encodements on a print media and generating encodement data file(s) and/or audibly reproducing the encodement(s)

The major components of the hand held reader 12 of the present invention that differ from those disclosed in the above-referenced, commonly assigned patent applications are further shown schematically in FIGS. 4 and 5. The operations of the hand held reader 12 in accordance with the present invention are illustrated in the flow chart of FIG. 6. These differences in the reader 12 of the present invention comprise multiple encodement illumination light sources and corresponding wavelength optical filters that can be sequentially employed either automatically in a predetermined sequence or selectively upon the initiative of the user to render the reader sensitive to the wavelengths or the selected wavelength, respectively. The reader captures and decodes the selected one or all encodements and plays back the decoded sound or displays the decoded visual information. Alternatively, the reader automatically determines the most recent or highest order invisible encodement as a function of the established hierarchy and generates an encodement data file and/or decodes and plays back or displays that information only. The reader can also advise the user of the number and wavelengths of the encodements that are detected in this process and provides an error signal if no encodement is detected.

Planar imager 54 preferably comprising a planar, two-dimensional array of light sensitive CCD or CMOS elements that are sensitive to the wavelength of absorption or fluorescence of the invisible material. The controller 52 contains the operating system and the mechanical and electrical components thereof for capturing each one or selected ones of a plurality of invisible encodements printed on a printed surface, decoding the symbology of each encodement into a data file, decompressing the decoded data file, converting it to analog audio signals and playing it back as sound through the built in amplifier and speaker 46. In addition, as described above, it is capable of formatting the symbology of the encodement into a encodement data file 42 for transmission to the personal computer 14.

The light source array 48 shown in FIG. 4 preferably comprises a plurality, e.g. three, light emitters 56, 58, 60 that emit three distinct invisible light wavelengths that comprise a defined hierarchy of wavelengths for reading a like, correlated, hierarchy of sensitive materials used to record or print the encodements in the manner described above. However, a single light source or emitter can be employed with a plurality of light filters that are selectively inserted into the light beam 70 as shown in FIG. 5.

A like plurality of spectral, long pass or bandpass, array filters, e.g., the three filters 62, 64, 66, are provided mounted to filter insertion and retraction apparatus or on a filter wheel or the like for selective insertion into the optical path 68 between the planar imager 54 and the image capture lens system or lens 50. The spectral array filters 62, 64, 66 are of the types which are transparent to a wavelength of emitted light 70 generated by or modulated by the symbology elements of the invisible encodement and that block other wavelengths of light reflected from the printed surface 32. The spectral array filters 62, 64, 66 can be bandpass filters that selectively pass narrow bandwidths of invisible light that is either the light emitted by the light emitters 56, 58, 60, and reflected from the printed surface 36, in the absorption case, or the fluorescent light emitted by the symbology elements, in the fluorescence case. Alternatively, at least the spectral array filter that is intended to pass the highest wavelength can be a long pass optical filter that only passes wavelengths above the lower wavelengths that are passed by the other spectral array filters. For example, the pthalocyanine dye disclosed in the above-incorporated U.S. patent application Ser. No. 09/223,859 absorbs at 890 nm. It can be used to record an invisible encodement and the encodement image can be detected using a Corian bandpass optical filter centered at 890 nm (part no. SID-890-R) or an Oriel long pass filter that passes wavelengths above 830 nm (part no. 59552).

In FIG. 4, light emitter 60 is depicted as energized by controller 52 to emit the emitted light beam 70 while corresponding spectral array filter 66 of the order of the encodement being read is inserted by controller 52 into the optical path 68. The planar imager 54 captures the filtered light reflected by printed surface 32 or emitted by the fluorescing or luminescent symbology elements and outputs data signals to the controller 52. The controller 52 processes the data signals and generates the audio playback by speaker 46 or the encodement data file 42.

Figure 6:
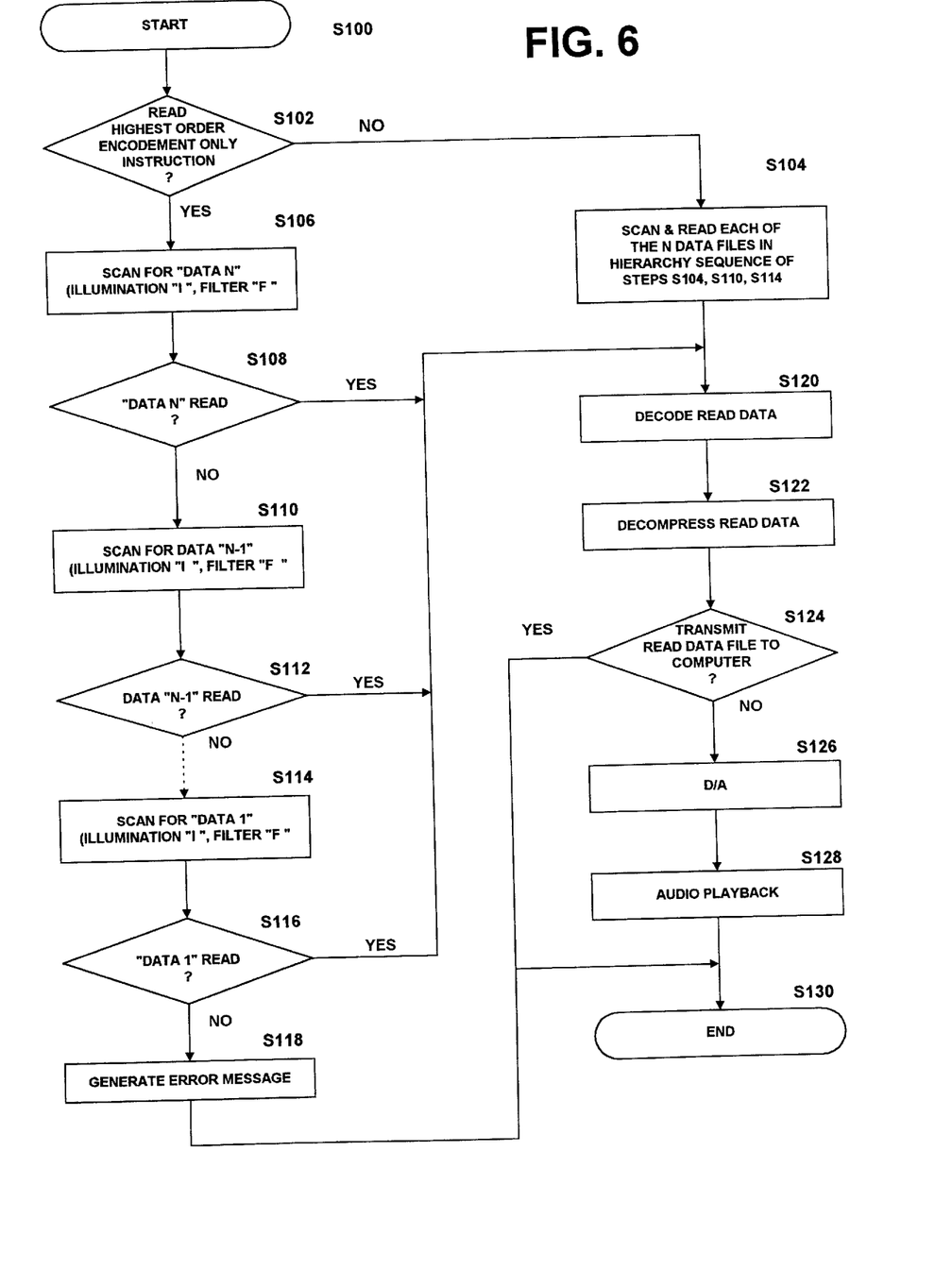
FIG. 6 is a flow chart illustrating operations of the hand held reader of the present invention.

FIG. 5 depicts the structure and functional blocks of the controller 52 of FIG. 4 in relation to reading the invisible encodements of the print media 30, 30' following one of the processes set forth in FIG. 6. The encodement is read or captured by planar imager 54 comprising a two-dimensional sensor array having an image plane on which the filtered symbology image of the encodement illuminated by illuminating light beam 70 is focused or projected by image capture lens 50. The sensor array preferably comprises a CCD or CMOS array that captures or "grabs" the illuminated encodement image and provides an array output signal 71 to image sensor electronics 74 which processes it into digital form. Image sensor electronics 74 converts encodement output signal 72 to a digital data file which is then stored in memory unit 80 by image threshold detector 76 if it passes criteria established by READ SELECTION instructions provided to hierarchy sequencer 78.

In this case, the light beam 70 is provided by a single light emitter 48' that is powered on by the EMITTER POWER signal from hierarchy sequencer 78. The wavelength of the illuminating light beam 70 is determined by the insertion of one of three emitter beam filters 57, 59 or 61 under the control of the EMITTER FILTER SELECT signal provided by hierarchy sequencer 78. A correlated, spectral bandpass, array filter 62, 64 or 66 is inserted in front of the planar array 54 in response to an EMITTER FILTER SELECT signal simultaneously provided by the hierarchy sequencer.

The image threshold detector 76 processes the encodement output signal 72 that is generated by the image sensor electronics 74 each time that the light emitter 48' emits the illuminating light beam 70. If the encodement output signal 72 exceeds noise threshold levels, the image threshold detector generates a DETECT signal that indicates that an invisible encodement is present that is responding to or modulating or fluorescing as a result of the illumination light beam wavelength that is impinging on the encodement. The hierarchy sequencer responds to the DETECT signal or the absence of a DETECT signal in determining to issue the STORE command.

The processed encodement output signal 72 is passed by image threshold detector 76 in response to a STORE command from hierarchy sequencer 78 to memory unit 80 and stored therein as encodement data. Image processor 82 retrieves the encodement data from memory unit 80 and manages the order in which the encodement data is decoded and decompressed in decoder 84 and decompressor 86. The operations performed in decoder 84 and decompressor 86 are essentially the inverse of the compression and encoding operation employed to generate and print the symbology of the encodement performed by the "PaperDisk" software, for example. The digital data output from decompressor 86 is converted to an analog signal by D/A converter 90 and applied to one or more output devices such as a speaker 46 or to a remote audio signal reproduction system 92. The encodement data file 42 is alternatively or additionally formatted in block 88 and provided to system 10 in one of the formats and by one of the transmission methods described above.

The encodement reader system of FIGS. 4 and 5 is preferably packaged into a hand held wand or is mounted in a fixture that also receives the object to be read. In use, the user holds the wand or adjusts the fixture so that a planar symbology image of the image field illuminated by emitter light beam 70 is imaged onto the planar sensor array 54. Although not specifically shown in FIGS. 4 and 5, it will be understood that the alignment can be maintained by additional elements disclosed in the above-incorporated U.S. patent application Ser. Nos. 09/122,502 and 09/121,907. Such elements include one or more marker projection source that emits one or more visible light beam that can be aligned with one or more visible fiducial 37, 39 or image field border printed on the object that marks the borders of the invisible encodement. The marker projection source includes one or more emitters that each project a bright light that is readily seen even in the presence of ordinary room lighting. Any bright light source can be used as an emitter, but it is currently preferred that the emitter be a coherent emitter, such as a laser diode, since current emitters produce bright, narrow beams with modest power consumption.

After the alignment with the invisible encodement is achieved in one of these manners, the user depresses a capture button to cause the hierarchy sequencer 78 to commence operations according to the steps of FIG. 6 to capture the encodements or a selected encodement. In this manner, the invisible encodement is converted into sound or print or visual information that can be heard or seen by the user and optionally used to determine whether to edit it.

The flow chart of FIG. 6 depicts the steps of operating the hand held reader 12 in either a mode of searching for the highest order encodement or a selected encodement or all encodements and capturing and reading the designated encodement(s) with the reading system of FIG. 5. In step S102 the READ SELECTION instruction applied to the hierarchy sequencer 78 causes it to either initiate the sequential steps S106–S118 for determining the highest order encodement and reading it in steps S120–S130. Or the instruction enables step S104 to sequentially follow steps S106, S110 and S114, each followed by steps S120–S130, to read all encodements that are present. Alternatively, a single specified encodement can be read using one of steps S106, S110 and S114, followed by steps S120–S130, to read a specified encodement that is present.

For example, in step S106, the highest order encodement is read (if present) by illuminating the image field with the highest order illumination wavelength $I_N$ and using the highest order spectral bandpass, array filter that passes light at wavelength $F_N$. If the highest order encodement "DATA N" is detected in step S108, then it is decoded in step S120, de-compressed in step S122, optionally encoded as a data file and transmitted to the personal computer in step S124 and/or converted to analog sound frequencies in step S126, played back in step S128, and the process is ended in step S130.

If the highest order encodement "DATA N" is not detected in step S108, then step S110 is followed to determine, in step S112, if the next highest order encodement "DATA N-1" is present. If the next highest order encodement "DATA N-1" is present, then steps S120–S130 are followed.

This process continues searching for the next lower order encodement, and if none is detected, then the lowest order encodement is searched for in step S114 using lowest order illumination wavelength $I_1$, and the lowest order spectral bandpass, array filter that passes light at wavelength $F_1$. If the lowest order encodement "DATA 1" is present, then steps S120–S130 are followed. But, if no encodement is found, then an error message is generated in step S118 and the process is ended at step S130.

When the encodement is found, the order of the encodement is indicated to the user so that the user can decide whether to retain it or to edit it if it is not the highest order encodement.

Figure 7:
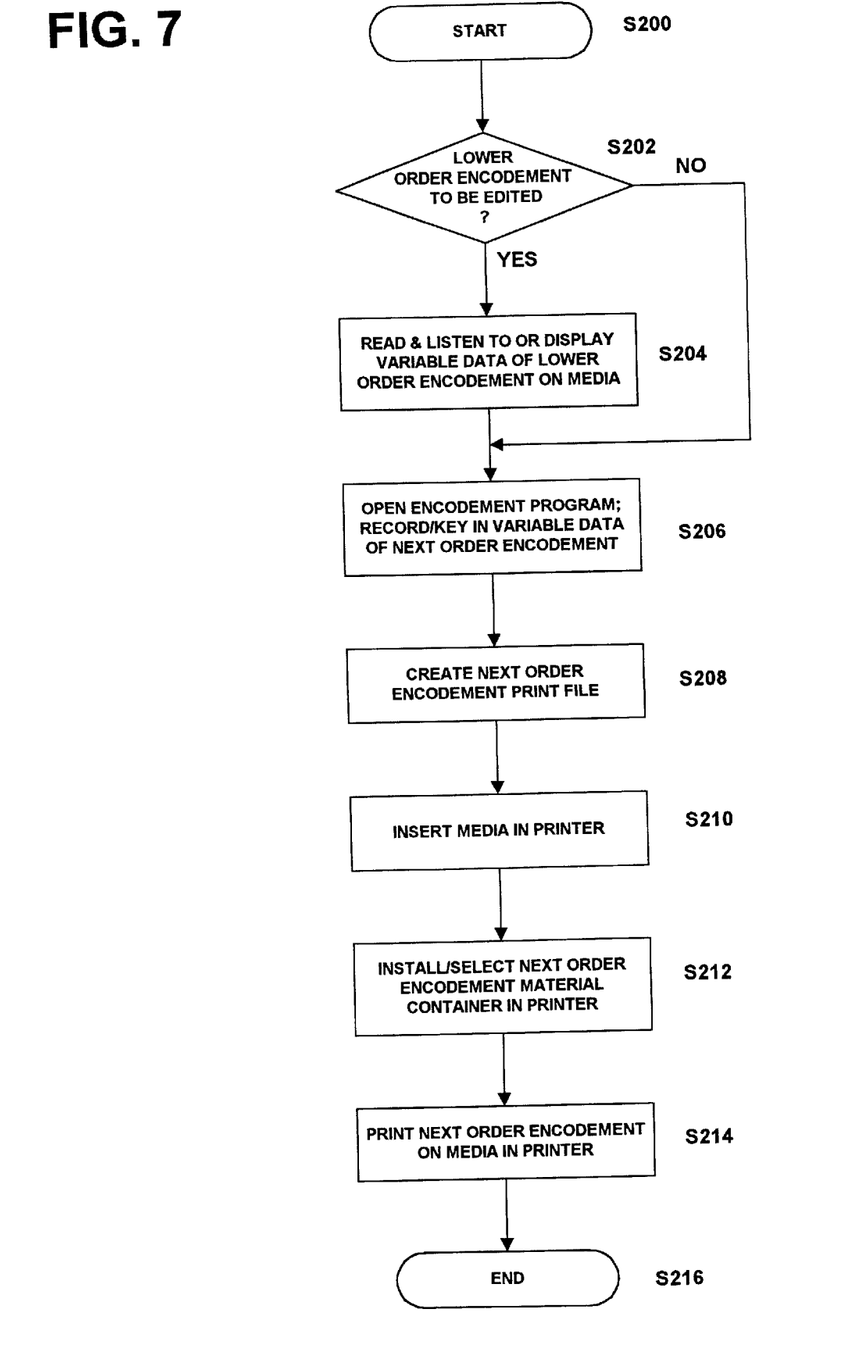
FIG. 7 is a flow chart illustrating the method of editing an encodement of FIG. 2 to highest order encodement of FIG. 3 employing the system of FIG. 1.

FIG. 7 depicts the general steps of recording an encodement using components of the user system 10 of FIG. 1, for example. In step S202, the determination is made whether a lower order encodement is to be edited or written over with a higher order encodement. If so, the steps of FIG. 6, for example, can be followed in step S204 to determine the contents or variable data of the lower order encodement and to compose the variable data of the higher order encodement in step S206. If not, then the variable data is composed in step S206. In either case, the computer 14 is used in conjunction with the encodement software, e.g., the above-referenced "PaperDisk" software to enter the composed variable data and format it into an encodement print file. The user opens the software and aurally records the variable data using microphone 21 or enters it on keyboard 18 via keystrokes in step S206. Or the user retrieves a pre-recorded file from computer or digital camera or hand held reader memory (for duplicating) and employs it. After the variable data is entered and viewed or listened to by the user, the user indicates acceptance of the variable data, and the next order encodement print file is created in step S208.

Then, the media that may have been read in step S204 is inserted into the printer 16 in step S210. The print file may indicate the order of the encodement so that the printer 16 can automatically select the correct encodement material container 40. Or the user may select and/or install the next order encodement material container 40 in printer 16 in step S212. The printer 16 is then enabled in step S214 to print the next order encodement, and the process is completed in step S216.

The user system 10 and the flow chart of FIG. 7 are generically illustrative of exemplary equipment and steps of transforming variable data into the encoded data of the encodement, and for using the encoded data to print the invisible encodement in the image field of any type of media or object. The user system 10 is a personal computer system or work station. However, the method of FIG. 7 can be employed in a high volume commercial system for reading lower order encodements and recording higher order encodements on media or objects on a wider scale.

The invention has been described in detail with particular reference to certain preferred embodiments thereof, but it will be understood that variations and modifications can be effected within the spirit and scope of the invention.

What is claimed is:

1. A method of editing an invisible encodement printed on a print media having a visible image in an image field comprising the steps of:

defining a hierarchy of invisible encodements, each encodement of the hierarchy comprising variable data adapted to be printed over the visible image employing a print material that is not visible to the human eye and is sensitive to a predetermined, distinct wavelength of light, whereby the invisible encodements of the hierarchy enable detection and decoding of each encodement under illumination by each predetermined, distinct wavelength of light to distinguish one encodement from another encodement on the print media;

illuminating the image field with selected light wavelengths;

detecting and decoding an existing invisible encodement already printed in the image field on the print media as variable data;

presenting said variable data as one of: a displayed image, audio play back, and visible print output;

composing an edited version of the variable data;

formatting said edited version of said variable data as an edited encodement; and printing the edited encodement in the image field employing a print material of the hierarchy that is sensitive to a predetermined light wavelength of the hierarchy that differs from the light wavelength that the print material employed to print the existing invisible encodement.

2. The editing method of claim 1, wherein the visible image is printed in an image field of a surface of the print media, and each encodement is printed in a symbology within the image field and over a substantial portion of the visible image in the image field.

3. The editing method of claim 2, wherein an invisible encodement of a higher order in the hierarchy is printed over an invisible encodement of a lower order.

4. The editing method of claim 1, wherein an invisible encodement of a higher order in the hierarchy is printed over an invisible encodement of a lower order.

5. The editing method of claim 1, wherein;

the visible image is a photographic print image provided by a photofinisher to a user; and the invisible encodement of lower order in the hierarchy comprises variable data recorded by a camera or camera user in association with the visible image that is printed by the photofinisher employing a material sensitive to a predetermined wavelength of light enabling detection and decoding of the encodement of lower order for reproduction of the variable data.

6. The editing method of claim 1, wherein the print materials of the encodements of the hierarchy of encodements are each sensitive to distinct radiation wavelengths that cause symbology elements of each encodement to absorb the radiation wavelength.

7. The editing method of claim 1, wherein the print materials of the encodements of the hierarchy of encodements are each sensitive to distinct radiation wavelengths that cause symbology elements of each encodement to fluoresce in response to the radiation wavelength.

8. The editing method of claim 1, wherein the illuminating step further comprises the steps of:

illuminating the invisible encodements with a plurality of light wavelengths of the hierarchy in a sequence commencing with the highest order light wavelength of the hierarchy and proceeding through all light wavelengths of the hierarchy to the lowest light wavelength of the hierarchy;

determining the highest order encodement when the material of that encodement responds to a light wavelength in the sequence;

reading the determined highest order encodement.

9. A method of reading the highest order encodement among a plurality of invisible encodements of a hierarchy of invisible encodements from highest to lowest order, each encodement printed in an image field on a media with a material sensitive to a predetermined light wavelength such that a detectable response is elicited from illumination of the material by the light wavelength the material is sensitive to comprising the steps of:

illuminating the invisible encodements with a plurality of light wavelengths of the hierarchy in a sequence commencing with the highest order light wavelength of the hierarchy and proceeding through all light wavelengths of the hierarchy to the lowest light wavelength of the hierarchy;

detecting the highest order encodement when the material of that encodement responds to a light wavelength in the sequence;

decoding the determined highest order encodement; and excluding said invisible encodements of lower order from said decoding.

10. The reading method of claim 9, wherein the print materials of the encodements of the hierarchy of encodements are each sensitive to distinct radiation wavelengths that cause symbology elements of each encodement to absorb the radiation wavelength.

11. The reading method of claim 9, wherein the print materials of the encodements of the hierarchy of encodements are each sensitive to distinct radiation wavelengths that cause symbology elements of each encodement to fluoresce in response to the radiation wavelength.

12. A method of reading one of a plurality of invisible encodements of a hierarchy of highest to lowest order invisible encodements, each encodement printed in an image field on a media with a material sensitive to a predetermined light wavelength such that a detectable response is elicited from illumination of the material by the light wavelength the material is sensitive to comprising the steps of:

starting sequential illumination of the invisible encodements with a plurality of light wavelengths of the hierarchy in a sequence commencing with one of the light wavelengths of the hierarchy and proceeding through all light wavelengths of the hierarchy;

detecting one of the encodements, if the material of that encodement responds to the respective light wavelength in the sequence;

reading the detected encodement; and automatically stopping said sequential illumination responsive to said detecting.

13. The reading method of claim 12, wherein the print materials of the encodements of the hierarchy of encodements are each sensitive to distinct radiation wavelengths that cause symbology elements of each encodement to absorb the radiation wavelength.

14. The reading method of claim 12, wherein the print materials of the encodements of the hierarchy of encodements are each sensitive to distinct radiation wavelengths that cause symbology elements of each encodement to fluoresce in response to the radiation wavelength.

15. A reader for reading the highest order encodement among a plurality of invisible encodements of a hierarchy of invisible encodements from highest to lowest order, each encodement printed in an image field on a media with a material sensitive to a predetermined light wavelength such that a detectable response is elicited from illumination of the material by the light wavelength the material is sensitive to comprising the steps of:

means for illuminating the invisible encodements with a plurality of light wavelengths of the hierarchy in a sequence commencing with the highest order light wavelength of the hierarchy and proceeding through all light wavelengths of the hierarchy to the lowest light wavelength of the hierarchy;

means for detecting the highest order encodement when the material of that encodement responds to a light wavelength in the sequence;

means for decoding the determined highest order encodement; and means for excluding said invisible encodements of lower order from said decoding.

16. The reader of claim 15, wherein the print materials of the encodements of the hierarchy of encodements are each sensitive to distinct radiation wavelengths that cause symbology elements of each encodement to absorb the radiation wavelength.

17. The reader of claim 15, wherein the print materials of the encodements of the hierarchy of encodements are each sensitive to distinct radiation wavelengths that cause symbology elements of each encodement to fluoresce in response to the radiation wavelength.

18. A reader for reading at least one of a plurality of invisible encodements of a hierarchy of highest to lowest order invisible encodements, each encodement printed in an image field on a media with a material sensitive to a predetermined light wavelength such that a detectable response is elicited from illumination of the material by the light wavelength the material is sensitive to comprising the steps of:

means for starting sequential illumination of the invisible encodements with a plurality of light wavelengths of the hierarchy in a sequence commencing with one of light wavelengths of the hierarchy and proceeding through all light wavelengths of the hierarchy;

means operable upon each illumination with a light wavelength for detecting one of the encodements if the material of that encodement responds to the respective light wavelength in the sequence;

means for reading the detected encodement; and means for automatically stopping said sequential illumination responsive to said detecting.

19. The reader of claim 18, wherein the print materials of the encodements of the hierarchy of encodements are each sensitive to distinct radiation wavelengths that cause symbology elements of each encodement to absorb the radiation wavelength.

20. The reader of claim 18, wherein the print materials of the encodements of the hierarchy of encodements are each sensitive to distinct radiation wavelengths that cause symbology elements of each encodement to fluoresce in response to the radiation wavelength.

21. The reader of claim 18, wherein said sequential illuminating means comprises a plurality of encodement illumination light sources; and means for selectively powering said plurality of encodement illumination light sources in a sequence to illuminate the encodements on the media with the hierarchy of illumination wavelengths.

22. A reader for reading at least one of a plurality of invisible encodements of a hierarchy of highest to lowest order invisible encodements, each encodement printed in an image field on a media with a material sensitive to a predetermined light wavelength such that a detectable response is elicited from illumination of the material by the light wavelength the material is sensitive to comprising the steps of:

means for sequentially illuminating the invisible encodements with a plurality of light wavelengths of the hierarchy in a sequence commencing with one of light wavelengths of the hierarchy and proceeding through all light wavelengths of the hierarchy;

means operable upon each illumination with a light wavelength for detecting the encodement if the material of that encodement responds to a light wavelength in the sequence; and means for reading the detected encodement;

wherein said means for sequential illuminating comprises a plurality of encodement illumination light sources; and means for selectively powering said plurality of encodement illumination light sources in a sequence to illuminate the encodements on the media with the hierarchy of illumination wavelengths; and wherein said means for reading comprises:

a planar imager providing an array output signal when exposed to light in an optical axis;

image sensor electronic means for processing the array output signal; and said means for sequentially illuminating further comprises:

a plurality of spectral array light filters; and means for selectively inserting said of spectral array light filters in said optical axis in a said sequence to pass light modulated by the encodements to said planar imager as said encodements on the media are illuminated with the hierarchy of illumination wavelengths.

23. A reader for reading at least one of a plurality of invisible encodements of a hierarchy of highest to lowest order invisible encodements, each encodement printed in an image field on a media with a material sensitive to a predetermined light wavelength such that a detectable response is elicited from illumination of the material by the light wavelength the material is sensitive to comprising the steps of:

means for sequentially illuminating the invisible encodements with a plurality of light wavelengths of the hierarchy in a sequence commencing with one of light wavelengths of the hierarchy and proceeding through all light wavelengths of the hierarchy;

means operable upon each illumination with a light wavelength for detecting the encodement if the material of that encodement responds to a light wavelength in the sequence;

means for reading the detected encodement;

wherein said means for sequentially illuminating comprises:

a light source emitting light onto said encodements;

a plurality of light filters; and means for selectively inserting said plurality of light filters between said light source and said encodements in a sequence to illuminate the encodements on the media with the hierarchy of illumination wavelengths.

24. The reader of claim 23, wherein said means for reading comprises:

a planar imager providing an array output signal when exposed to light in an optical axis;

image sensor electronic means for processing the array output signal;

a plurality of spectral array light filters; and means for selectively inserting said of spectral array light filters in said optical axis in said sequence to pass light modulated by the encodements to said planar imager as said encodements on the media are illuminated with the hierarchy of illumination wavelengths.

25. The editing method of claim 1, wherein said edited encodement is a higher order encodement and is printed over an invisible encodement of a lower order in the hierarchy and said illuminating further comprises initially illuminating with a first wavelength of light to which said higher order encodement is sensitive and subsequently illuminating with a second wavelength of light to which said lower order encodement is sensitive.

26. The editing method of claim 2, wherein said edited encodement is a higher order encodement and is printed over an invisible encodement of a lower order in the hierarchy and said illuminating further comprises initially illuminating with a first wavelength of light to which said higher order encodement is sensitive and subsequently illuminating with a second wavelength of light to which said lower order encodement is sensitive.

27. The editing method of claim 1, wherein said print media bears a plurality of invisible encodements during said illuminating step.

28. A method for reading at least one of a plurality of invisible encodements of a hierarchy of highest to lowest order invisible encodements, each encodement being sensitive to a predetermined light wavelength such that a detectable response is elicited from illumination with the light wavelength the material is sensitive to comprising the steps of:

sequentially illuminating the invisible encodements with a plurality of light wavelengths of the hierarchy in a sequence commencing with one of light wavelengths of the hierarchy and proceeding through all light wavelengths of the hierarchy;

detecting the encodement if the material of that encodement responds to a light wavelength in the sequence; and reading the detected encodement;

wherein said sequentially illuminating further comprises:

selectively filtering with ones of a plurality of spectral array filters in a sequence as said encodements on the media are illuminated with respective ones of the hierarchy of illumination wavelengths.

29. The method of claim 28 wherein said sequentially illuminating further comprises selectively powering a plurality of encodement illumination light sources in a sequence to illuminate the encodements on the media with the hierarchy of illumination wavelengths.

\* \* \* \* \*